(12) United States Patent
Muldoon et al.

(10) Patent No.: US 9,819,015 B2
(45) Date of Patent: Nov. 14, 2017

(54) ENCAPSULATED SULFUR SUB-MICRON PARTICLES AS ELECTRODE ACTIVE MATERIAL

(71) Applicant: Toyota Motor Engineering & Manufacturing North America, Inc., Erlanger, KY (US)

(72) Inventors: John G. Muldoon, Saline, MI (US); Claudiu B. Bucur, Ypsilanti, MI (US); Adrian Lita, Ypsilanti, MI (US)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 141 days.

(21) Appl. No.: 14/489,597

(22) Filed: Sep. 18, 2014

(65) Prior Publication Data

US 2016/0087266 A1    Mar. 24, 2016

(51) Int. Cl.
*H01M 4/36* (2006.01)
*H01M 4/587* (2010.01)
*H01M 4/38* (2006.01)
*H01M 4/60* (2006.01)
(Continued)

(52) U.S. Cl.
CPC .......... *H01M 4/366* (2013.01); *H01M 4/38* (2013.01); *H01M 4/587* (2013.01); *H01M 4/602* (2013.01); *H01M 4/625* (2013.01); *H01M 2004/028* (2013.01)

(58) Field of Classification Search
CPC .. H01M 4/136; H01M 4/1297; H01M 4/3266; H01M 4/581
See application file for complete search history.

(56) References Cited

U.S. PATENT DOCUMENTS 6,479,146 B1 * 11/2002 Caruso ................. A61K 9/5089
                                                                    106/409
6,479,571 B1 * 11/2002 Cooke ...................... C08K 9/04
                                                                    523/205
(Continued)

FOREIGN PATENT DOCUMENTS

| CN | 103474633 | 12/2013 | |
| WO | WO 2013/192629 | * 12/2013 | ............... G01V 3/26 |
| WO | WO 2013/192629 A1 | 12/2013 | |

OTHER PUBLICATIONS

Chapter 3, pp. 87-97: Polyelectrolyte Adsorption and Multilayer Formation (Jean-Francoic Joanny and Martin Castelnovo) from Multilayer Thin Films: Sequential Assembly of Nanocomposite Materials (Textbook), Edited by Gero Decher, Joseph B. Schlenoff, Published Online Feb. 18, 2003.*

(Continued)

*Primary Examiner* — Ula C Ruddock
*Assistant Examiner* — Amanda Barrow
(74) *Attorney, Agent, or Firm* — Oblon, McClelland, Maier & Neustadt, L.L.P.

(57) ABSTRACT

A core-shell elemental sulfur sub-micron particle having a core of elemental sulfur and a shell of a membrane containing alternating layers of oppositely charged polyelectrolytes is provided. A functionalized conductive carbon material is optionally present in one or more of the core and an outer layer. A cathode containing the core-shell elemental sulfur sub-micron particle and a lithium-sulfur battery constructed with the cathode are also provided.

18 Claims, 8 Drawing Sheets

(51) Int. Cl.
*H01M 4/62* (2006.01)
*H01M 4/02* (2006.01)

(56) References Cited

U.S. PATENT DOCUMENTS

| | | | | |
|---|---|---|---|---|
| 6,833,192 | B1* | 12/2004 | Caruso | A61K 9/5026 |
| | | | | 427/128 |
| 8,663,840 | B2 | 3/2014 | Nazri et al. | |
| 2002/0149656 | A1* | 10/2002 | Nohr | B41M 5/5218 |
| | | | | 347/95 |
| 2003/0113627 | A1* | 6/2003 | Choi | H01M 4/0404 |
| | | | | 429/218.1 |
| 2005/0053718 | A1 | 3/2005 | Choi et al. | |
| 2007/0287060 | A1 | 12/2007 | Naoi et al. | |
| 2008/0227888 | A1* | 9/2008 | Jobmann | B01J 13/18 |
| | | | | 523/200 |
| 2011/0165466 | A1 | 7/2011 | Zhamu et al. | |
| 2012/0119161 | A1* | 5/2012 | Son | H01B 1/122 |
| | | | | 252/506 |
| 2013/0065128 | A1 | 3/2013 | Li et al. | |
| 2013/0164615 | A1* | 6/2013 | Manthiram | H01B 1/122 |
| | | | | 429/212 |
| 2013/0171355 | A1* | 7/2013 | Wang | H01M 4/38 |
| | | | | 427/337 |
| 2013/0224594 | A1* | 8/2013 | Yushin | H01M 4/38 |
| | | | | 429/218.1 |
| 2013/0330619 | A1 | 12/2013 | Archer et al. | |
| 2014/0029162 | A1* | 1/2014 | Hur | H01G 11/30 |
| | | | | 361/502 |
| 2014/0199592 | A1 | 7/2014 | Pyun et al. | |
| 2014/0205912 | A1 | 7/2014 | Skotheim et al. | |
| 2014/0234707 | A1* | 8/2014 | Muldoon | H01M 4/622 |
| | | | | 429/211 |
| 2014/0287301 | A1* | 9/2014 | Yushin | H01M 4/366 |
| | | | | 429/188 |
| 2015/0221935 | A1* | 8/2015 | Zhou | H01M 4/581 |
| | | | | 429/213 |

OTHER PUBLICATIONS

Chapter 8, pp. 207-243: Layer-by-Layer Assembly of Nanoparticles and Nanocolloids: Intermolecular Interactions, Structure and Materials Perspectives (N.A. Kotov) from Multilayer Thin Films: Sequential Assembly of Nanocomposite Materials (Textbook), Edited by Gero Decher, Joseph B. Schlenoff, Published Online Feb. 18, 2003.*

Wang et al., "Graphene-Wrapped Sulfur Particles as Rechargeable Lithium-Sulfur Battery Cathode material with High Capacity and Cycling Stability," Nano Lett. 2011, 11, 2644-2647, Published Jun. 24 2011.*
Decher, "Fuzzy Nanoassemblies: Toward Layered Polymeric Multicomposites," Science, vol. 277, Aug. 29, 1997.*
Yang et al., "Improving the Performance of Lithium-Sulfur Batteries by Conductive Polymer Coating," ACS Nano, vol. 5, No. 11, pp. 9187-9193, published online Oct. 13, 2011.*
Zhou et al., Polydopamine-Coated, Nitrogen-Doped Hollow Carbon-Sulfur Double-Layered Core-Shell Structure for Improving Lithium-Sulfur Batteries, Nano Lett. 2014, 14, 5250-5256, published Aug. 26, 2014.*
Miller, M.D., & Bruening, M.L., "Controlling the nanofiltration properties of multilayer polyelectrolyte membranes though variation of film composition," Langmuir, 20(26), 11545-11551, 2004 (no month given); abstract provided.*
Porcel et al., "From Exponential to Linear Growth in Polyelectrolyte Multilayers," Langmuir, 2006 (no month listed), 22 (4376-4383).*
Li et al, High-performance hollow sulfur nanostructured battery cathode through a scalable, room temperature, one-step, bottom-up approach, Proc. Natl. Acad. Sci., vol. 110, No. 18, pp. 7148-1753, Published Apr. 30, 2013.*
Manthiram et al, "Rechargeable Lithium-Sulfur Batteries," Chemical Reviews, ACS Publications, American Chemical Society, Special Issue: 2014, batteries, Published Jul. 15, 2014.*
International Preliminary Report of Patentability and Written Opinion and Search History pages dated Dec. 17, 2015 in PCT/US15/49329 (English translation only).
Yuan Yang et al., "Improving the Performance of Lithium-Sulfur Batteries by Conductive Polymer Coating", ACS Nano, vol. 5, No. 11, Oct. 13, 2011, pp. 9187-9193.
Weiyang Li, et al., "High-Performance Hollow Sulfur Nanostructured Battery Cathode Through a Scalable, room Temperature, One-Step, bottom-up Approach", Proc. Natl. Acad. Sci., vol. 110, No. 18. (pp. 7148-7153) (Apr. 30, 2013).
Arumugam Manthiram, et al., "Rechargeable Lithium-Sulfur Batteries", Chemical Reviews, ACS Publications, American Chemical Society, Special Issue:2014, batteries:DOI: 10, 1021/cr500062v, Publication Date: Jul. 15, 2014.
Claudiu B. Bucur, et al., "Ultrathin Tunable Ion Conducting Nanomembranes for Encapsulation of Sulfur Cathodes", Energy & Environmental Science, vol. 6, (pp. 3286-3290) (2013), Publication date: Sep. 25, 2013.

* cited by examiner $$Na_2S_2O_3 + 2HCl \rightarrow 2NaCl + SO_2 \uparrow + S \downarrow + H_2O$$

$$Na_2S_2O_3 + 2HCl \rightarrow 2NaCl + SO_2 \uparrow + S \downarrow + H_2O$$

ENCAPSULATED SULFUR SUB-MICRON PARTICLES AS ELECTRODE ACTIVE MATERIAL

BACKGROUND OF THE INVENTION

Field of the Invention

This invention is directed to novel encapsulated sub-micron sulfur particles which are suitable for utility as an electrode active material. In particular, the invention is directed to sub-micron sulfur particles which are formed in the presence of a mixed hydrophilic/hydrophobic copolymer. The resulting encapsulated sulfur sub-micron core particle is coated with a membrane of layers of self-assembling conductive polymer layers, each successive layer having a charge opposite to the previous layer. The invention is also directed to a cathode containing the membrane coated encapsulated sulfur sub-micron particles and an electrochemical cell or battery containing the cathode. The invention is further directed to a lithium-sulfur battery containing the membrane coated carbon-sulfur composite cathode.

Discussion of the Background

In an ongoing effort to develop alternative vehicle energy power sources to the combustion engine, one area of development has been a plugin electric vehicle. To date much of the effort has been directed to lithium ion batteries as a power source for such vehicles. However, to become mainstream and to compete with the combustion engine in terms of cost and driving range, a significant improvement in the energy density of lithium ion batteries is necessary. The Holy Grail of post lithium ion research is to increase energy densities by utilization of conversion cathodes with high volumetric capacities such as sulfur or oxygen in combination with a pure metal anode. As an active cathode material, elemental sulfur can provide five times higher capacity than conventionally employed materials based on transition metal oxides or phosphates.

Although studies in lithium/sulfur battery date back to the early 1960's, the system has yet become commercially significant due to limited cycle life. Various problems have hindered the practical use of this highly attractive cathode including the insulating nature of sulfur which retards its reduction and poor electrode stability owing to the solubility in the electrolyte of the polysulfides generated during reduction of sulfur ($Li_2S_x$, x=8, 6, 5 and 4). Over the last fifty years, methods for preventing migration of polysulfides have been intensively investigated by research teams worldwide. Significant advancements have been achieved by optimizing the electrolyte composition or replacing the liquid based electrolyte with polymeric electrolytes.

One approach to solving this problem is to restrain the polysulfides generated by constraint of the sulfur into metal organic frameworks or a conductive host such as porous carbon. However, this technique offers only a partial confinement to the polysulfide species, and capacity losses observed after 100 cycles are often too great to provide useful lifetime. In other approaches to further confine the highly polar polysulfide species, the surface of the carbon has been adjusted by functionalizing with inorganic oxides or polymers with the aim of providing an exterior coating to restrict migration of polysulfides.

While there have been significant advancements in understanding the challenges of Li—S batteries, the development of ion selective membranes may be crucial to actual commercialization due to their potential to impede lithium polysulfide dissolution while permitting rapid diffusion of lithium ions.

Fu et al. reported discharge rates as high as 1C obtained with a sulfur composite containing a mixed ionic-electronic conductor (MIEC) (Fu, Y.; Manthiram, A. Enhanced Cyclability of Lithium-Sulfur Batteries by a Polymer Acid-Doped Polypyrrole Mixed Ionic-Electronic Conductor. Chem. Mater. 2012, 24, 3081-3087). The MIEC is a polymer doped polypyrrole (PPy) which is synthesized by oxidation polymerization of pyrrole monomer using ammonium peroxydisulfate as an oxidant in the presence of poly(2-acrylamido-2-methyl-1-propanesulfonic acid) (PAAMPSA). The oxidized (p-doped) form of PPy is treated with an acid for removing an electron from its backbone and produces a free radical and cation (also called a polaron). The cation couples with the sulfonic acid moiety in PAAMPSA, resulting in a polyelectrolyte complex with favorable ionic and electronic properties. The S-MIEC composite cathode showed improved electrochemical stability. It is claimed that the polyelectrolyte complex facilitates ion and electron transfer while capturing intermediate polysulfides via ion exchange. A capacity of 500 mAh/g S (45% sulfur in cathode) can be retained after 50 cycles at a high rate of 1C.

A different type of polymeric complex was reported by Wang et al (Wang, L.; Wang, D.; Zhang, F.; Jin, J. Interface Chemistry Guided Long-Cycle-Life Li—S Battery. Nano Lett. 2013, 13, 4206-4211). A polydopamine (PD)/poly (acrylic acid) (PAA) complex held together by a cross link reaction which forms a robust network containing the GO/S components via rigid covalent bonds was constructed. An initial capacity of 1350 mAh/g was reported for the first cycle at a low discharge rate of approximately C/3 (60% sulfur cathode content). A 45% capacity fade was observed over 500 cycles. The report claims the rigidity of the framework is advantageous for inhibition of polysulfide loss but no remarks are given on the impact it has on volume change mechanics between charge and discharge.

A concept similar to that used by Fu et al is the utilization of an ionic shield for polysulfides. Sulfonate-end capped ($SO_3^-$) perfluoroalkyl ether groups of Nafion coated Celgard 2400 allow ion hopping of positively charged $Li^+$ but inhibits hopping of negative polysulfides due to coulombic interactions (Huang, J.-Q.; Zhang, Q.; Peng, H.-J.; Liu, X.-Y.; Qian, W.-Z.; Wei, F. Ionic Shield for Polysulfides towards Highly-Stable Lithium-sulfur Batteries. Energy Environ. Sci. 2013, 7, 347-353). This cation "permselective membrane" is claimed to act as an electrostatic shield for polysulfide ions and retained about 425 mAh/g capacity after 500 cycles at a high rate of 1C (50% sulfur cathode content). Two oxidation waves were reported in the cyclic voltammograms corresponding to a stepwise transformation between $S_8$ and $Li_2S_4$.

The concept of reducing the mobility of polysulfides based on their ionic properties utilized by Fu et al in their utilization of MEIC polyelectrolyte complexes was also the foundation for the approach reported by Bucur et al (Bucur, C. B.; Muldoon, J.; Lita, A.; Schlenoff, J. B.; Ghostine, R. A.; Dietz, S.; Allred, G. Ultrathin Tunable Ion Conducting Nanomembranes for Encapsulation of Sulfur Cathodes. Energy Environ. Sci. 2013, 6, 3286-3290), where carbon/sulfur composites were encapsulated with ultrathin (5 nm) polyelectrolyte multilayers (PEML) composed of three to five layers of sequentially adsorbed polyions having opposing charges. Poly(diallylammonium chloride) (PDAD) and poly(styrene sulfonate) (PSS) were employed to form the PEML's. Such PEMLs have been reported to benefit from highly conformal coverage and precise control over their assembly. They have also been reported to be flexible and self-healing. These properties are ideal for sulfur cathode applications. They possess an amorphous, interpenetrated bulk structure consisting of a majority of intrinsic sites between two oppositely charged polymers and a minority of extrinsic sites between solution ions and polyelectrolyte backbone charges. Diffusion through the membrane is governed by the number of extrinsic sites which permits hopping of ions. An ion with a single charge (lithium salts) will hop more freely than a divalent ion (polysulfides). It is interesting to note that the content of extrinsic compensation can be adjusted by the ionic strength of the solution in which assembly of the membrane occurs. Membranes assembled from high ionic strength solutions result in poor capacity retention because the higher number of extrinsic sites promotes the diffusion of both the lithium and polysulfide ions. A capacity of approximately 600 mAh/g S was reported after 300 cycles at a high rate of 1C and after 100 cycles at an ideal rate of 5C (45% sulfur cathode content). Facile oxidation (recharging) kinetic behavior was displayed by the two waves visible in the cyclic voltammogram right below and above 2.3V.

While various and intricate carbon/sulfur composites have been reported to increase the electronic conductivity of sulfur, it has been the use of polymers as interface modifiers, composites or coatings which have drastically improved the cyclability of sulfur cathodes by presumably trapping or limiting the diffusion of polysulfides. In addition, polymers can provide an elastic framework for sulfur which can accommodate the ~20% volume expansion reported between the charged (elemental sulfur, density ~2.0 g/cm3) and discharged species (Li2S, density 1.66 g/cm3). Attempts to provide rigid encapsulation to sulfur (carbon or oxide based) could not provide a stable barrier to polysulfide diffusion due to rupturing during cycling.

In addition, the use of polymers as encapsulating membranes for sulfur particles provides opportunity for reducing the high polymer contents associated with sulfur/polymer composites and thus the overall capacities based on total cathode mass may be increased. Ideally, while providing a barrier to migration of the bulkier polysulfides the encapsulating membrane does not impede electronic or ionic conduction of lithium ions. For optimum performance the membrane must be comparatively thin, conformal to the encapsulating substrate and flexible to accommodate the volume changes of the sulfur core between charge and discharge.

In order to extend the lifetime beyond that offered by carbon/sulfur composites, a team comprising the present inventors encapsulated carbon-sulfur composites with tunable, self-assembled nano-membranes which restrict the diffusion of polysulfides while allowing for diffusion of the lithium ions. (Bucur, C. B.; Muldoon, J.; Lita, A.; Schlenoff, J. B.; Ghostine, R. A.; Dietz, S.; Allred, G. Ultrathin Tunable Ion Conducting Nanomembranes for Encapsulation of Sulfur Cathodes. Energy Environ. Sci. 2013, 6, 3286-3290) Batteries with cathodes constructed with these encapsulated sulfur composites operate for more than 300 cycles with less than 15% capacity loss (capacities above 600 mAh/g) at a high rate of 1C.

While the self-assembled nano-membranes inhibit polysulfide dissolution, the final cathode structure contains a low sulfur loading of approximately 50% due to the use of the melt-infusion of sulfur into high surface area carbon. The resulting carbon/sulfur composite has a high content of carbon. In order to obtain a Li/S battery with energy densities more than two times higher than Li-ion batteries, sulfur loading greater than 75% by weight is required.

Much effort directed to increasing lithium-sulfur battery capacity has been reported.

Skotheim et al. (US 2014/0205912) describe lithium batteries having a lithium anode which is protected by a multi-layer coating structure. Each of the films of the multi-layer structure allows passage of lithium ions, but act as a barrier for other cell components to reach the lithium metal surface. Electrochemical cells and batteries containing the multi-coated anode are described and cathodes constructed of a mixture of elemental sulfur, a conductive carbon material, and a binder. Conductive polymer materials are disclosed as possible carbon constituents. However, as indicated in Example 7, the materials are mixed or blended and applied to an electrode substrate. Sub-micron sulfur particles encapsulated in conductive polymer multilayer systems as active cathode components are neither disclosed nor suggested.

Pyun et al. (U.S. 2014/0199592) describes sulfur composites which are copolymers of elemental sulfur and comonomers selected from ethylenically unsaturated monomers, epoxide monomers and thiirane monomers. The potential value of a lithium-sulfur battery is recognized and the deficiencies of conventional elemental sulfur based cathodes are described. Thus this reference addresses the stability problem by incorporation of copolymer having a high content of copolymerized sulfur and one or more of the previously listed comonomers. A comonomer composite containing conductive filler is described wherein the conductive filler is either present during the polymerization or is physically blended with the formed copolymer.

Archer et al. (U.S. 2013/0330619) describes a cathode active material for a lithium-sulfur battery that is a mesoporous carbon containing infused sulfur. The mesoporous carbon matrix is obtained by forming a highly porous metal oxide template, fusing the metal oxide template with a carbonaceous material such as pitch and sintering. The metal oxide is then etched from the sintered mass leaving a mesoporous carbon into which gaseous sulfur is infused. The material is then milled to small size. Archer does not disclose or suggest sub-micron sulfur particles encapsulated in conductive polymer multilayer systems.

Wang (U.S. 2013/0171355) describes a sulfur graphene composite material which can be employed as an active ingredient of a cathode in a lithium-sulfur battery. The composite is prepared by mixing a dispersion of graphene and a solution of sulfur, precipitating the sulfur onto the graphene, removing the solvents and treating the residue to form an active material.

Li et al. (U.S. 2013/0065128) describes lithium-sulfur batteries with cathode active materials being hollow nanostructures (tubes, fibers, spheres) containing elemental sulfur and/or an active sulfur compound. According to Li, the sulfur does not occupy the entire volume of the hollow space, such that allowance is made for expansion and contraction of the sulfur material during the charging and discharging phases. The hollow nanostructures are first formed and then the sulfur/sulfur compound infused. Sub-micron sulfur particles encapsulated in conductive polymer multilayer systems as active cathode components are neither disclosed nor suggested in the description of this reference.

Zhamu et al. (U.S. 2011/0165466) describes lithium-sulfur batteries wherein the cathode is constructed of a nano-filament web of carbon nano fibers, graphite nanofibers, carbon nanotubes, etc. Upon construction of the cell, lithium sulfide and/or lithium polysulfide is deposited on the nano-filaments and upon charge these materials convert to elemental sulfur on the cathode and lithium metal at the anode. Zhamu does not disclose or suggest cathode architecture of sub-micron sulfur particles encapsulated in conductive polymer multilayer systems.

Naoi et al. (U.S. 2007/0287060) describes a cathode active sulfur composite of elemental sulfur and/or a compound having a sulfur-sulfur bond with microparticles of a conductive material such as carbon black (Ketjen Black). A mechanical composite of the sulfur and carbon black is first formed. The thus formed composite is heated above the melting point such that the conductive microparticles are infused into the sulfur melt which is then stressed into a fibrous form. This is cooled and pulverized and a thin uniform coating of the conductive microparticles applied to the surface of the pulverized particles. The thus formed composite material is the active component of a cathode for a lithium-sulfur battery.

Choi et al. (U.S. 2005/0053718) describes a cathode material for a lithium-sulfur battery wherein particles of elemental sulfur are coated with an inorganic salt such as an alkali metal alkoxide, a borate salt, a metal oxide or a silicate. The coating is applied to the sulfur core from solution with drying.

Nazri et al. (U.S. Pat. No. 8,663,840) describes a cathode active material for a lithium-sulfur battery that consists of carbon nanotubes which contain sulfur or a sulfur compound within the hollow interior of the nanotube. The nanotubes are first formed and then the sulfur component placed in the hollow area by melt infusion, sublimation or solution filling followed by evaporation of the solvent. The exterior of the filled nanotubes is then cleaned of sulfur residue and a cathode constructed with the composite nanotubes.

Wang et al. (CN103474633) (Abstract only) describes a complex composite and cathode structure for a lithium-sulfur battery containing the composite. The composite is comprised of a core of nano-carbon particles which is over coated with elemental sulfur or a polysulfide mixture. Alternatively, the nanoparticles are surface bonded with a polymeric cross-linking system and the sulfur material is incorporated in that cross-linking matrix. This composite is coated onto a carbon nanoparticle sulfur core-shell material. The mixture is coated to a substrate to form a positive electrode which is functional for a lithium-sulfur battery.

Li et al. (Proc. Natl. Acad. Sci., 2013, 2) describes a core-shell nanoparticle having a sulfur core prepared by insitu precipitation of the sulfur in the presence of a polymer. A core shell nanoparticle coated with poly(3,4-ethylenedioxythiophene) (PEDOT) is described.

Manthiram et al. (Chem. Rev. 2014, Special Issue: 2014 Batteries: DOI: 10, 1021/cr500062v) provides a review of progress in sulfur based materials for lithium-sulfur batteries. A carbon-sulfur composite coated with PEDOT:PSS is described.

In order to provide lithium-sulfur batteries having significantly increased energy density, high capacity cathode materials are necessary.

Thus, an object of the present invention is to provide a sulfur composition which is suitable for utility as an electrode active material for a battery having high capacity and high cycle lifetime.

A second object of the invention is to provide a cathode containing sulfur as an active material which is suitable for utility in a battery having high capacity and high cycle lifetime.

A third object of the invention is to provide a lithium-sulfur battery which has sufficient capacity and lifetime to be a viable energy source for a vehicle.

SUMMARY OF THE INVENTION

These and other objects have been achieved according to the present invention, the first embodiment of which provides a core-shell sub-micron particle, comprising:
a core comprising elemental sulfur; and
a shell comprising a first layer closest to the sulfur core of ionically charged, self-assembling conductive copolymer having at least one hydrophobic region; and
at least a second conductive polymer layer having an electrical charge opposite to the first layer adjacent to and ionically bonded with the first layer;
wherein
optionally, at least one of the core and an outer layer comprises a functionalized carbon black.

In one embodiment, the nanoparticle comprises the functionalized carbon black and the functionalized carbon black is dispersed in the sulfur core.

In another embodiment the nanoparticle comprises the functionalized carbon black and the functionalized carbon black is on or embedded in an outermost conductive polymer layer.

In a further embodiment the nanoparticle comprises the functionalized carbon black and the functionalized carbon black is dispersed in the sulfur core and is on or embedded in an outermost conductive polymer layer.

In an aspect of each of these embodiments, the functionalized carbon comprises a carboxyl group (—COOH) as a functional component.

In another preferred embodiment, the present invention provides a cathode comprising the core-shell sub-micron particle of any of the embodiments according to the present invention as an active material and in a further preferred embodiment, the present invention includes a lithium-sulfur battery comprising the cathode.

The present invention includes a vehicle containing the lithium-sulfur battery according to the embodiments of the invention.

The foregoing paragraphs have been provided by way of general introduction, and are not intended to limit the scope of the following claims. The presently preferred embodiments, together with further advantages, will be best understood by reference to the following detailed description taken in conjunction with the accompanying drawings.

DETAILED DESCRIPTION OF THE INVENTION

Throughout this description all ranges described include all values and sub-ranges therein, unless otherwise specified. Additionally, the indefinite article "a" or "an" carries the meaning of "one or more" unless otherwise specified. According to the present invention the term "vehicle" means any power driven device designed for transportation including an automobile, truck van, bus, golf cart and other utility forms of transportation.

The inventors are directing effort and resources to the study of materials useful to produce a battery of sufficient capacity and cycle lifetime to be competitive with and replace a combustion engine as a power source as well as other utilities requiring a high capacity, high cycle lifetime battery. In addition, a battery suitable for large scale intermittent energy storage will also be important for storage of green energy such as provided by wind and solar generation methods.

In order to achieve this goal and in view of the technologies described above, the inventors have studied methods to increase the sulfur density of cathodic materials. In this effort, the inventors have surprisingly discovered that the use of carbon hosts conventionally employed can be eliminated and sub-micron sulfur particles can be generated in-situ from the reaction of sodium thiosulfate with an acid such as hydrochloric acid in the presence of specific polymers which encapsulate the formed sulfur particles. The sulfur generating reaction (FIG. 1) is conducted in the presence of polymers which contain hydrophobic and hydrophilic domains. The structure of the polymers governs the growth of hydrophobic sulfur near the hydrophobic domains. The polymer backbone rearranges in the hydrophilic medium (usually aqueous solutions) to form enclosed structures such as spheres/cubes, rhomboids, etc. which encapsulates elemental sulfur.

An example of a polymer composition having hydrophobic and hydrophilic domains is a polymer salt of poly(3,4-ethylenedioxythiophene) (PEDOT) and polystyrene sulfonate (PSS). When the reaction takes place in the presence of conductive grade PEDOT:PSS (Aldrich), sulfur particles less than 1 micrometer in diameter (FIG. 1) inside thin PEDOT:PSS shells are obtained. Since PEDOT:PSS has an overall negative charge, additional polymer layers can be adsorbed on the PEDOT:PSS layer (given positively charged polymers such as polydimethyldiallyl ammonium chloride (PDADMAC) are used—FIG. 1). Further multiple alternating layers of oppositely charged conductive polymers may be built-up on this structure to tune the particle properties.

Although highly efficient charge/discharge performance and no overcharging are observed when such particles are employed as an active cathode material in a lithium-sulfur battery, the inventors have learned that the polymer coating of the sub-micron elemental sulfur particles leads to high impedance and high hysteresis. However, the inventors have learned that inclusion of a conducting carbon material within and/or on the sub-micron core-shell particles increases the conductivity and leads to significantly improved performance as a cathode active material.

Thus the first embodiment of the present invention provides a core-shell sub-micron particle, comprising:

a core comprising elemental sulfur; and a shell comprising a first layer closest to the sulfur core of ionically charged, self-assembling conductive copolymer having at least one hydrophobic region; and at least a second conductive polymer layer having an electrical charge opposite to the first layer adjacent to and ionically bonded with the first layer;

wherein optionally, at least one of the core and surface of an outer layer comprises a functionalized conductive carbon material.

The functionalized conductive carbon material may contain any functional group that promotes dispersion within the formed elemental sulfur core or adhesion or adsorption to the outermost ionic conductive polymer layer.

The functionalized carbon material may be any conductive carbon material which can be functionalized for compatibility with the sub-micron particle structure and morphology according to the present invention. Examples of such materials include Ketjen black (carbon black), acetylene black, vapor grown carbon fiber, graphene, natural graphite, artificial graphite and activated carbon.

In one embodiment of the present invention the conductivity of the sub-micron sulfur core-shell particles is increased with —COOH functionalized Ketjen Black® 600JD (Akzo Nobel Chemicals B.V.).

In an embodiment of the present invention the sub-micron particle comprises the functionalized carbon black and the functionalized carbon black is dispersed in the sulfur core.

In another embodiment, the sub-micron particle comprises the functionalized carbon black and the functionalized carbon black is on or embedded in an outermost conductive polymer layer.

In a further embodiment, the nanoparticle comprises the functionalized carbon black and the functionalized carbon black is dispersed in the sulfur core and is on or embedded in an outermost conductive polymer layer.

In reference to the schematic diagrams, TEM and SEM images of the sub-micron particles according to the invention (FIGS. 6, 7, 10 and 11) the inventors have described the sub-micron particles as "decorated" with the functionalized carbon.

The content or amount of functionalized carbon black in the sub-micron particles may be from 0 to 5% by weight of the total weight of the final submicron care-shell particle weight. In those embodiments wherein the functionalized carbon is present, the amount may be from 0.1 to 5% by weight, preferably 0.25 to 3.0 weight %, and most preferably, from 0.5 to 2.5 weight %.

Figure 6:
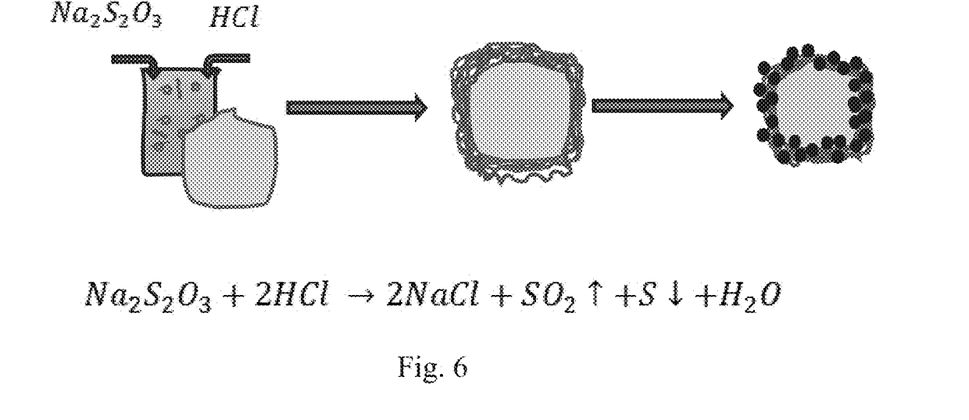
FIG. 6 shows a schematic diagram for the synthesis of sub-micron sulfur particles encapsulated by a polymer membrane composed from 7 layers of PEDOT:PSS/PDADMAC. This particle is then decorated with —COOH functionalized Ketjen Black 600JD.
Figure 10:
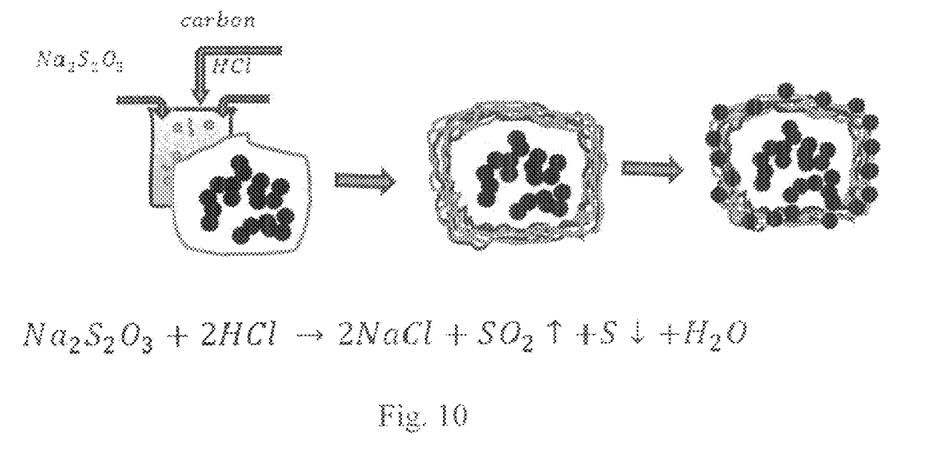
FIG. 10 shows a schematic diagram for the synthesis of sub-micron sulfur particles according to one embodiment of the present invention as described in Example 3.

The sub-micron particles obtained according to the methods described in Examples 2 and 3 and shown in FIGS. 6 and 10 provide a sulfur cathodic material with very high sulfur content (>95% can be routinely obtained) and thus addresses the need identified above for higher sulfur content to obtain increased energy density.

According to the present invention the elemental sub-micron sulfur particles are formed by precipitation from solution of a sulfur precursor and in one embodiment may be formed as indicated in the following equation:

$Na_2S_2O_3 + 2HCl \rightarrow 2NaCl + SO_2\uparrow + S\downarrow + H_2O$.

Although this example is provided, the invention is not limited to the particular chemistry described and any method to form and precipitate elemental sulfur in the present of polymers which contain hydrophobic and hydrophilic domains may be employed.

As indicated in the Examples, the obtained sulfur particles were wrapped in 7 layers of PEDOT:PSS/PDADMAC. The conductive hydrophobic/hydrophilic polymer employed to guide formation of the sulfur sub-micron particles (PEDOT:PSS) carries a net negative charge and therefore, may be overcoated with a positively charged conductive polymer such as PDADMAC which is ionically attracted to the PEDOT:PSS layer. Alternating layers of opposite charge may be applied in any number to tune the properties of the particles.

Although a PEDOT:PSS/PDADMAC system is explicitly described, one of ordinary skill in the art may select other conductive polymer systems having corresponding conceptual relationship as that described above and will perform as according to the elements of the present invention. Such systems are considered to be within the scope of the present invention.

In a further embodiment, the present invention provides an electrode, preferably a cathode containing the decorated or not decorated sub-micron sulfur core-shell particles. A sulfur cathode may be prepared by mixing the sub-micron particles according to the above description with one or more binders and other materials conventionally employed to prepare a cathode structure. These materials may be mixed as a slurry, coated onto a metal foil, and dried. The methods of construction of a cathode employing an active material are conventionally known and any such method that is compatible with the decorated or not decorated sub-micron sulfur core-shell particles of the invention may be employed.

Suitable binders known to one of ordinary skill which are chemically stable in the potential window of use of the cell may include thermoplastics and thermosetting resins. For example, polyethylene, polypropylene, polytetrafluoroethylene (PTFE), Polyvinylidene fluoride (PVDF), styrene butadiene rubber, a tetrafluoroethylene hexafluoro ethylenic copolymer, a tetrafluoroethylene hexafluoropropylene copolymer (FEP), a tetrafluoroethylene perfluoroalkyl vinyl ether copolymer (PFA), ethylene-tetrafluoroethylene copolymer (ETFE resin), polychlorotrifluoroethylene resin (PCTFE), a propylene-tetrafluoroethylene copolymer, an ethylene-chlorotrifluoroethylene copolymer (ECTFE) and an ethylene-acrylic acid copolymer. These binders may be used independently, or mixtures may be used.

The components may be wet blended in the presence of a suitable solvent or dry blended using a mortar or other conventionally known mixing equipment. The mixture may then be applied to a charge collector by conventionally known methods. Any suitable charge collector may be employed. Preferred charge collectors may be any of carbon, stainless steel, nickel, aluminum and copper.

The cathode thus prepared may be employed in the construction of an electrochemical cell or battery in a conventionally known manner. In a preferred embodiment the cathode may be combined with an anode having lithium as an active material.

Thus, the present invention provides a lithium-sulfur battery comprising a lithium anode and a cathode comprising the decorated or not decorated sub-micron sulfur core-shell particles according to the present invention.

Nonaqueous solvents suitable as an electrolyte include cyclic carbonates, chain carbonates, cyclic esters, cyclic ethers and chain ethers. Examples of a cyclic carbonate include ethylene carbonate, propylene carbonate, butylene carbonate and vinylene carbonate. Examples of a chain carbonate include dimethyl carbonate, diethyl carbonate and methyl ethyl carbonate. Examples of a cyclic ester carbonate include gamma butyrolactone and gamma valerolactone. Examples of a cyclic ether include tetrahydrofuran and 2-methyltetrahydrofuran. Examples of a chain ether include dimethoxyethane and ethyleneglycol dimethyl ether.

The lithium electrolyte ion or mobile ion carrier may be any conventionally known to one of skill in the art and may include one or more of $LiPF_6$, $LiClO_4$, $LiAsF_6$, $LiBF_4$, $LiN(CF_3SO_2)_2$, $Li(CF_3SO_3)$ and $LiN(C_2F_5SO_2)_2$.

In further embodiments the present invention includes a vehicle containing a lithium-sulfur battery according to the present invention wherein the vehicle includes an automobile, truck van, bus, golf cart and other utility forms of transportation.

Having generally described this invention, a further understanding can be obtained by reference to certain specific examples which are provided herein for purposes of illustration only and are not intended to be limiting unless otherwise specified.

EXAMPLES

Example 1—Encapsulated Sulfur Particles with No Modified Carbon

Figure 1:
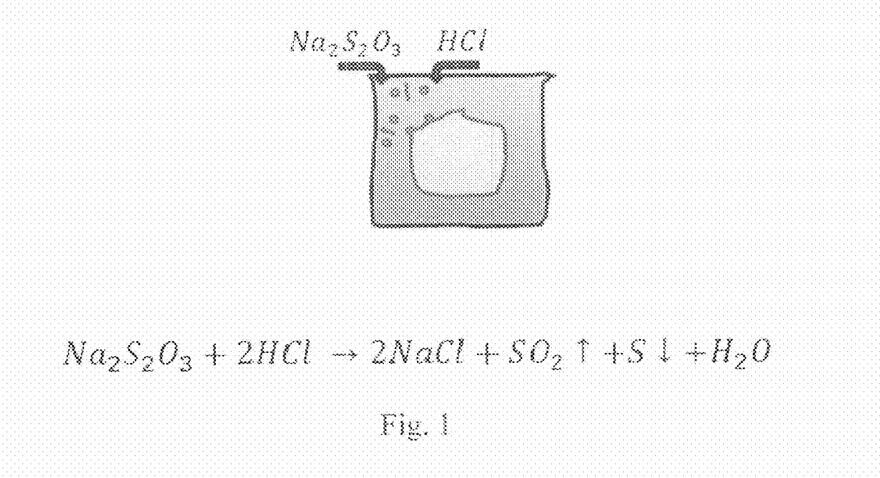
FIG. 1 shows a schematic diagram for preparation of the coated encapsulated sulfur sub-micron particles according to one embodiment of the present invention.
Figure 2A:
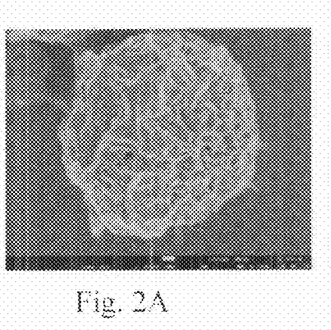
FIG. 2A shows a SEM image of a single coated encapsulated sulfur nanoparticle according to one embodiment of the present invention.
Figure 2B:
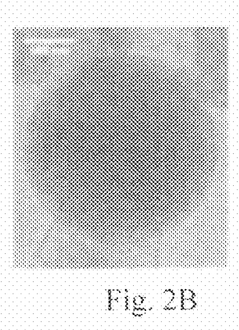
FIG. 2B shows a TEM image (B) of a single coated encapsulated sulfur nanoparticle according to one embodiment of the present invention.
Figure 2C:
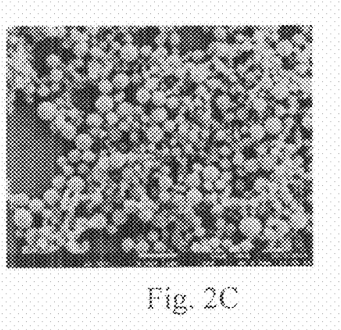
FIG. 2C shows a SEM image of an aggregation of the single particles obtained in Example 1.

Sulfur particles were generated according to the chemical reaction shown in FIG. 1 in the presence of conductive grade PEDOT:PSS (Aldrich). Sulfur particles less than 1 micrometer in diameter were obtained (FIG. 2) inside thin PEDOT:PSS shells. A sulfur material with very high sulfur content (>95%) was obtained.

Figure 3A:
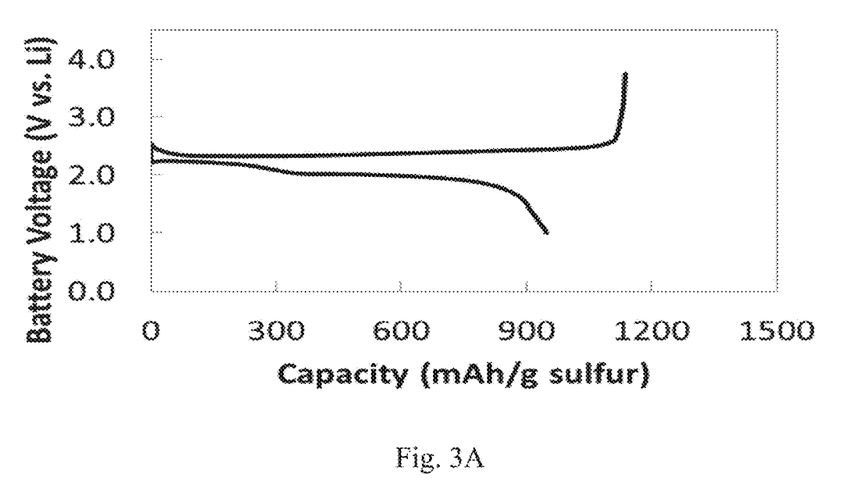
FIG. 3A shows a first fixed current charge/discharge electrochemical profile for a cell constructed with single coated encapsulated nanoparticles prepared in Example 1.
Figure 3B:
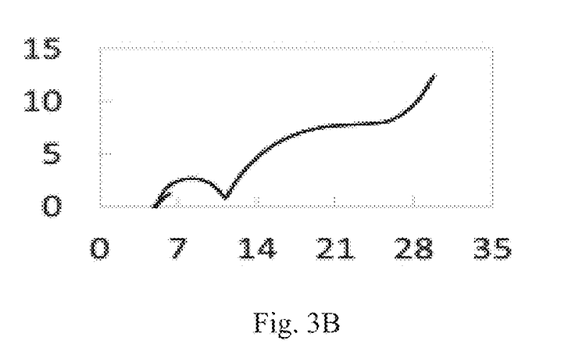
FIG. 3B shows the cell impedance before cycling for a cell constructed with single coated encapsulated nanoparticles prepared in Example 1.
Figure 4:
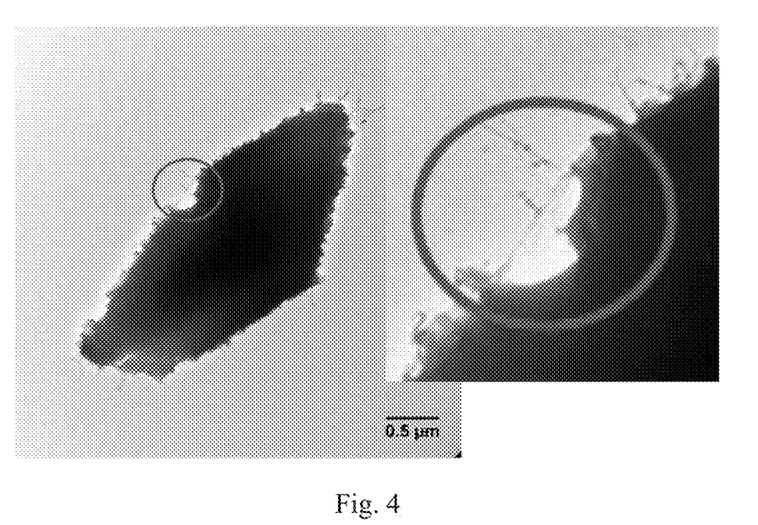
FIG. 4 shows a TEM image of a melting sulfur particle obtained in Example 1. The polymer encapsulating membrane can be observed in the inset.
Figure 5:
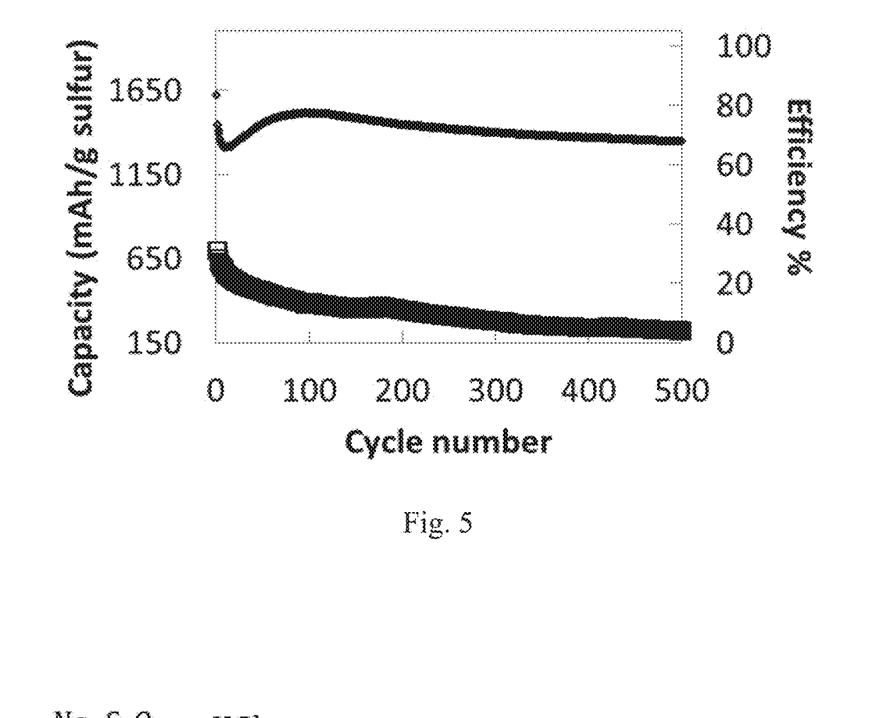
FIG. 5 shows the capacity fade over the first 500 cycles for the cell prepared in Example 1.

A battery having a lithium metal anode and a cathode containing the PEDOT:PSS coated sulfur particles (50% sulfur in final cathode) was constructed. The electrochemical response of the battery at a high rate of 2C is shown in FIG. 3A. The thin polymer coating (~3 nm, FIG. 4) permitted battery operation over 500 cycles (FIG. 5) with very low initial cell impedance (see FIG. 3B). The capacity was ~950 mAh/g sulfur. Polysulfide dissolution was likely the cause of the overcharging observed in FIG. 3A and the low coulombic efficiency of 70% seen in FIG. 5.

Example 2—Encapsulated Sulfur Particles with Modified Carbon on Surface

Figure 7:
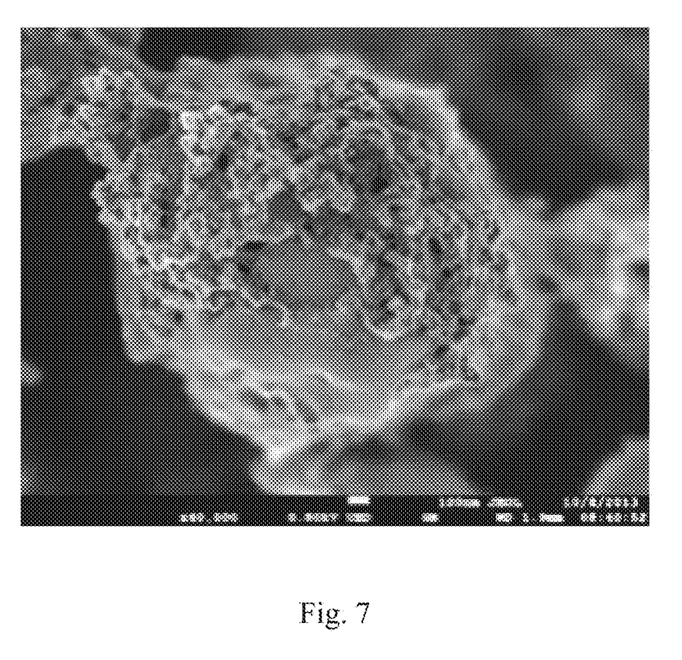
FIG. 7 shows a SEM image of a sub-micron sulfur particle encapsulated by 7 layers of PEDOT:PSS/PDADMAC and partially decorated by functionalized Ketjen Black 600JD carbon as described in Example 2.

Sub-micron sulfur particles were prepared in the presence of conductive grade PEDOT:PSS (Aldrich), as described in FIG. 6. The obtained sulfur particles were less than 1 micrometer in diameter and were encapsulated inside thin PEDOT:PSS shells. Since PEDOT:PSS has an overall negative charge, a layer of positively charged poly(dimethyldiallyl ammonium chloride) (PDADMAC) was adsorbed on the PEDOT:PSS shells. The application of alternating PEDOT:PSS shell/PDADMAC coating was repeated until a total of seven layers was obtained. COOH functionalized Ketjen Black 600JD was then applied to the outer surface of the sulfur/polymer spheres in minimum amounts and with intimate contact (FIG. 6 and FIG. 7). Thus a sulfur material with very high sulfur contents (>95%) was obtained. FIG. 7 shows the SEM image of the sub-micron sulfur particle encapsulated by 7 layers of PEDOT:PSS/PDADMAC and partially covered with functionalized Ketjen Black 600JD carbon that was obtained.

A 2032 coin cell battery having a lithium metal anode and a cathode containing the functionalized carbon coated sub-micron sulfur particles wrapped in a polymer membrane composed from 7 layers of PEDOT:PSS/PDADMAC (50% sulfur in final cathode) was then prepared and evaluated for performance.

Figure 8A:
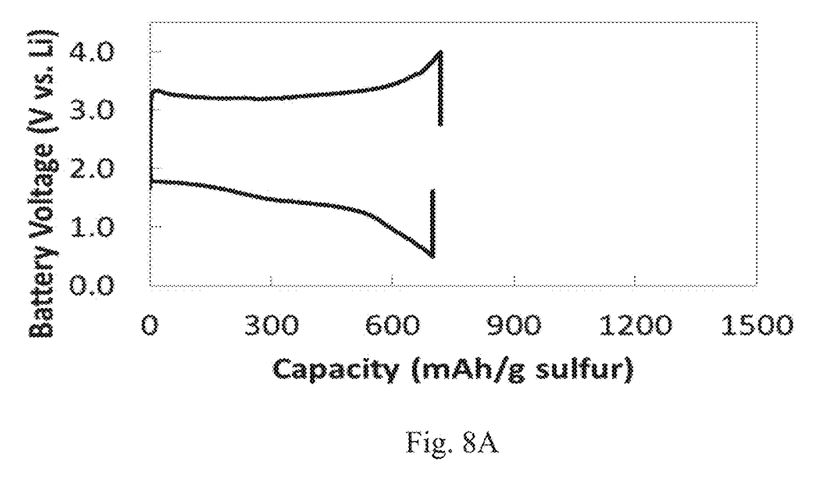
FIG. 8A shows the first fixed current charge/discharge electrochemical profile for the battery prepared in Example 2.
Figure 8B:
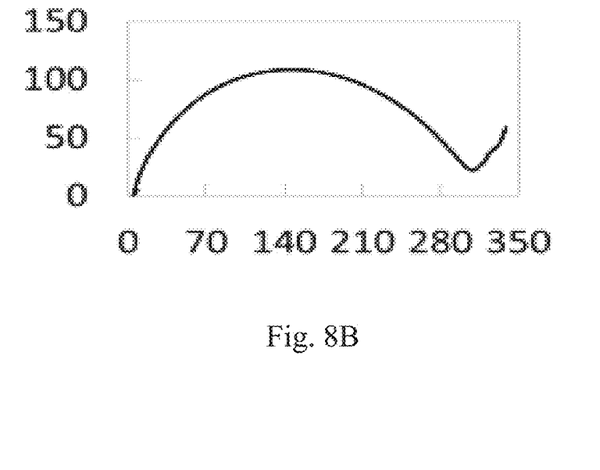
FIG. 8B shows the cell impedance before cycling for a cell constructed with single coated encapsulated nanoparticles prepared in Example 2.
Figure 9:
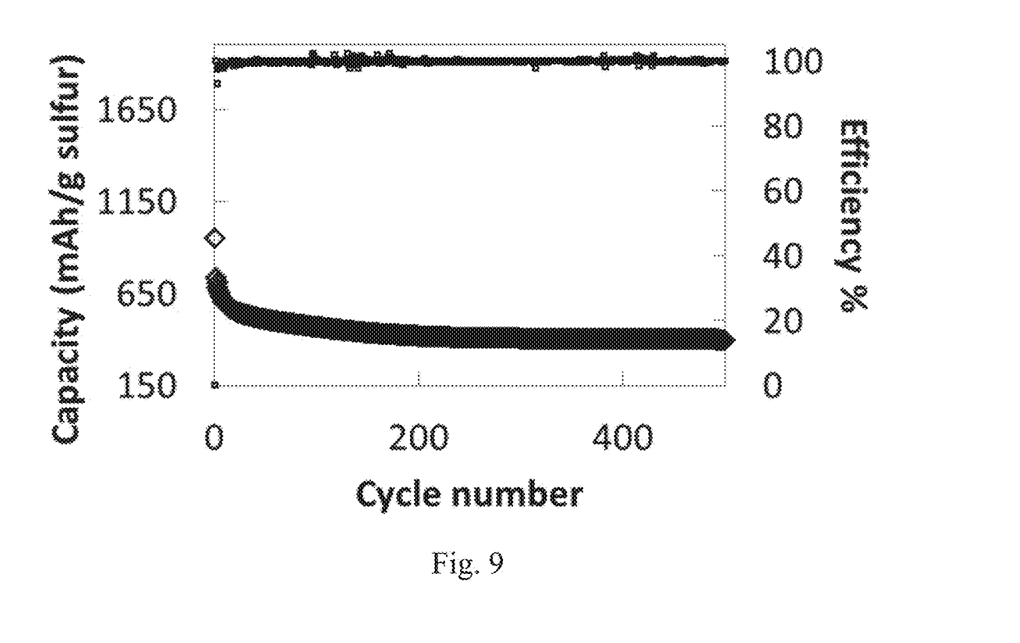
FIG. 9 shows the capacity fade over the first 500 cycles for the battery prepared in Example 2.

The electrochemical response of the battery at a high rate of 2C is shown in FIG. 8A. The 7 layer polymer coating caused a high impedance of ~300 Ohm·cm$^2$ and high hysteresis (higher than 1V) between charge and discharge (inset in FIG. 8B) but the charge/discharge efficiency was nearly 100% (FIG. 9) and no overcharging due to polysulfide dissolution was visible in the first discharge cycle. The capacity was ~750 mAh/g sulfur. The battery was cycled for over 500 cycles (FIG. 9).

Figure 11A:
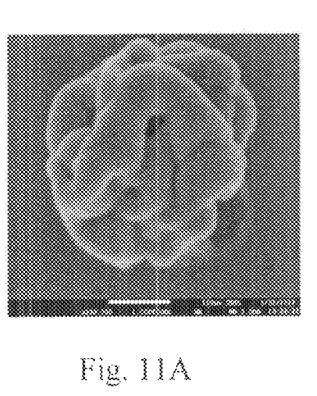
FIG. 11A shows the SEM image of a single sub-micron particle obtained in Example 3.
Figure 11B:
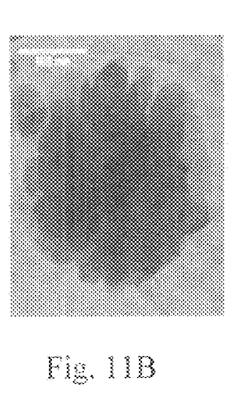
FIG. 11B shows the TEM image of a single sub-micron sulfur particle obtained in Example 3.
Figure 11C:
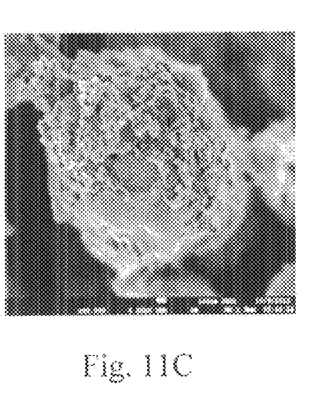
FIG. 11C shows the SEM image of an aggregate of the sub-micron particles obtained in Example 3.

Example 3—Encapsulated Sulfur Particles with Modified Carbon in Core and on Surface Sub-micron sulfur particles were prepared in a reaction mixture containing —COOH functionalized Ketjen Black 600JD in the presence of conductive grade PEDOT:PSS (Aldrich) as shown in FIG. 10. The obtained sulfur particles containing the functionalized carbon were less than 1 micrometer in diameter and were encapsulated inside thin PEDOT:PSS shells. Since PEDOT:PSS has an overall negative charge, a layer of positively charged poly(dimethyldiallyl ammonium chloride) (PDADMAC) was adsorbed on the PEDOT:PSS shells. The application of alternating PEDOT:PSS shell/PDADMAC coating was repeated until a total of seven layers was obtained. COOH functionalized Ketjen Black 600JD was then applied to the outer surface of the sulfur/polymer spheres in minimum amounts and with intimate contact (FIG. 10). Thus a highly conductive sulfur material with very high sulfur contents (>95%) was obtained. FIGS. 11A and B show the SEM image and TEM image of a single sub-micron sulfur particle encapsulated by 7 layers of PEDOT:PSS/PDADMAC and partially covered with functionalized Ketjen Black 600JD carbon that was obtained. FIG. 11C shows an aggregation of these particles.

A 2032 coin cell battery having a lithium metal anode and a cathode containing the functionalized carbon both within the sulfur core and coated on the polymer membrane composed from 7 layers of PEDOT:PSS/PDADMAC (50% sulfur in final cathode) was then prepared and evaluated for performance.

Figure 12:
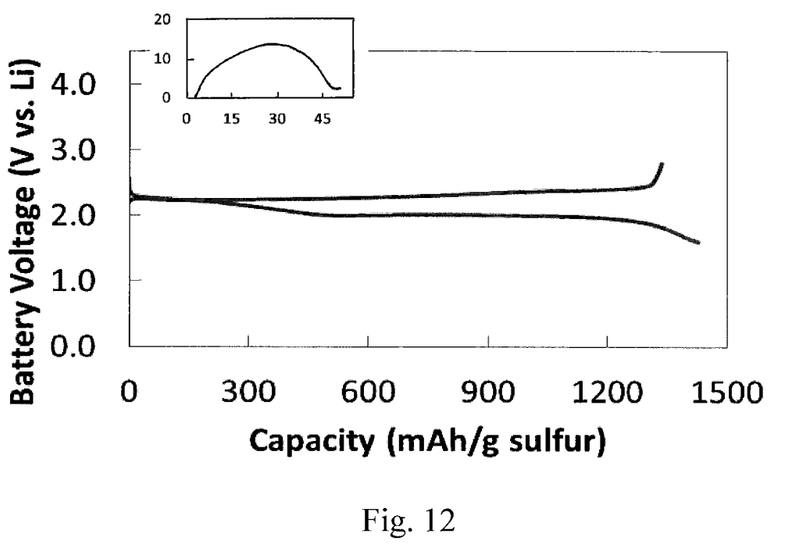
FIG. 12 shows he first fixed current charge/discharge electrochemical profile of the battery prepared in Example 3. The cell impedance before cycling is shown in the inset.
Figure 13:
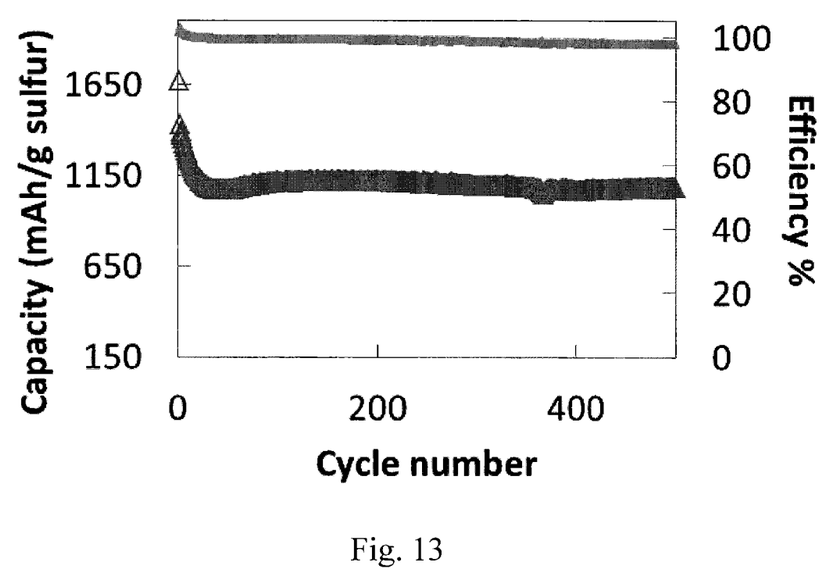
FIG. 13 shows the capacity fade over the first 500 cycles for the battery prepared in Example 3.

The electrochemical response of the battery at a high rate of 2C is shown in FIG. 12. The battery was cycled for over 500 cycles (FIG. 13).

Materials:

Poly(diallyldimethylammonium chloride) (PDADMAC, Polysciences), Mw=8,500; poly(4-styrene sulfonic acid), Mw=75,000 (PSS, Sigma Aldrich); poly(3,4-ethylenedioxythiophene)-poly(styrene sulfonate), high conductivity grade (PEDOT:PSS, Sigma Aldrich); SuperPLi from TIMCAL and a mixture of polyvinylidene fluoride/n-Methyl-2-pyrrolidone (PVDF/NMP) were used for cathode slurry preparation. Slurry dilutions were performed with the addition of cyclopentanone, ReagentPlus, >=99% (Sigma Aldrich). The electrolyte used in electrochemical cells was composed of 1M LiTFSI salt (purchased from 3M) in a 1:1 mixture of anhydrous 1,3-dioxolane (Sigma Aldrich) and 1,2-dimethoxyethane (Sigma Aldrich).

Methods:

Electrochemistry.

Working electrodes were prepared by casting a 80 μm slurry containing the coated sulfur particles from the Examples above, 20% SuperP Li and 3% PVDF binder diluted as needed with NMP/cyclopentanone on a 12 μm Al foil current collector. The total cathode weight was maintained at approximately 3 mg. The electrodes were dried at 60° C. for 24 hours and then transferred inside the Ar-filled glove box for coin cell assembly. Lithium metal foil (1 mm thick) was used as the anode. 2032 stainless steel coin cells with a Celgard 2325 separator were used for electrochemical measurements. Charge and discharge rates were calculated assuming theoretical capacity for the total amount of sulfur in the cathode. BioLogic SAS, model VMP3, multi-channel Science Instruments potentiostats were used for electrochemical measurements. Data was processed with EC-Lab Software V 10.02 with the corresponding VMP3 firmware, provided by Science Instruments.

The invention claimed is:

1. A cathode comprising:
   a conductive substrate, and
   an active material coating on the conductive substrate, comprising:
   a sulfur material comprising:
   sub-micron core shell particles comprising a core of a single precipitated elemental sulfur particle inside a shell comprising a first layer closest to the single sulfur particle core of an ionically charged, self-assembling conductive copolymer having at least one hydrophobic region; and
   at least a second conductive polymer layer having an electrical charge opposite to the first layer adjacent to and ionically bonded with the first layer;
   wherein
   the core of the single precipitated elemental sulfur particle is formed in the presence of the ionically charged, self-assembling conductive copolymer having at least one hydrophobic region, and
   the core of the single precipitated elemental sulfur particle comprises particles of a functionalized conductive carbon material dispersed within the core.

2. The cathode of claim 1, wherein the functionalized conductive carbon material is —COOH functionalized Ketjen Black® (carbon black).

3. The cathode of claim 1, wherein an elemental sulfur content of the cathode active material is 75% by weight or greater of the total cathode active material weight.

4. A lithium-sulfur battery, comprising
an anode comprising lithium metal; and
the cathode of claim 1.

5. The lithium-sulfur battery of claim 4, wherein the functionalized conductive carbon material is —COOH functionalized Ketjen Black® (carbon black).

6. The lithium-sulfur battery of claim 4, wherein an elemental sulfur content of the cathode active material is 75% by weight or greater of the total cathode active material weight.

7. A vehicle comprising the lithium-sulfur battery of claim 4.

8. The cathode of claim 1, wherein an elemental sulfur content of the sulfur material is at least 95% by weight.

9. The cathode of claim 1, wherein a content of the functionalized conductive carbon dispersed in the core is from 0.1 to 5% by weight of the core-shell particles.

10. The cathode of claim 1, further comprising the functionalized conductive carbon is on or embedded in a surface of an outer conductive polymer layer and a content of the functionalized conductive carbon is from 0.1 to 5% by weight of the core-shell particles.

11. The cathode of claim 1, wherein the core of the single precipitated elemental sulfur is less than 1 micrometer in diameter.

12. The cathode of claim 11, wherein the conductive polymer having at least one hydrophobic region is a polymer salt of poly(3,4-ethylenedioxythiophene) (PEDOT) and polystyrene sulfonate (PSS).

13. The cathode of claim 12, wherein the second conductive polymer layer comprises polydimethyldiallyl ammonium chloride (PDADMAC).

14. The cathode of claim 13 comprising a total of seven alternating layers of PEDOT-PSS and PDADMAC.

15. The lithium-sulfur battery of claim 4, wherein a content of the functionalized conductive carbon is from 0.1 to 5% by weight of the core-shell particles.

16. The lithium-sulfur battery of claim 4, further comprising functionalized conductive carbon on or embedded in a surface of an outer conductive polymer layer wherein a content of the functionalized conductive carbon is from 0.1 to 5% by weight of the core-shell particles.

17. The lithium-sulfur battery of claim 4, wherein the conductive polymer having at least one hydrophobic region is a polymer salt of poly(3,4-ethylenedioxythiophene) (PEDOT) and polystyrene sulfonate (PSS) and the core of precipitated elemental sulfur is less than 1 micrometer in diameter.

18. The lithium-sulfur battery of claim 4, wherein the second conductive polymer layer comprises polydimethyldiallyl ammonium chloride (PDADMAC).

* * * * *